(12) United States Patent
Shen et al.

(10) Patent No.: US 11,579,105 B2
(45) Date of Patent: Feb. 14, 2023

(54) APPARATUS AND METHOD FOR STATE DETECTION

(71) Applicant: ZTE Corporation, Shenzhen (CN)

(72) Inventors: Shaowu Shen, Shenzhen (CN); Liting Liu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 147 days.

(21) Appl. No.: 16/966,427

(22) PCT Filed: Feb. 1, 2019

(86) PCT No.: PCT/CN2019/074484
§ 371 (c)(1),
(2) Date: Jul. 30, 2020

(87) PCT Pub. No.: WO2019/149277
PCT Pub. Date: Aug. 8, 2019

(65) Prior Publication Data
US 2021/0041385 A1    Feb. 11, 2021

(30) Foreign Application Priority Data

Feb. 1, 2018  (CN) .......................... 201810103596.6

(51) Int. Cl.
*G01N 27/02*    (2006.01)
*G08B 21/24*    (2006.01)
(Continued)

(52) U.S. Cl.
CPC ......... *G01N 27/025* (2013.01); *G01N 27/028* (2013.01); *G08B 21/24* (2013.01);
(Continued)

(58) Field of Classification Search
CPC ...... G08B 21/24; G08B 19/00; G08B 21/182; G01N 27/025; G01N 27/028;
(Continued)

(56) References Cited

U.S. PATENT DOCUMENTS

2006/0152405 A1* 7/2006 Egri ...................... G01S 13/878
                                                          342/437
2011/0195661 A1    8/2011 Miyashita
(Continued)

FOREIGN PATENT DOCUMENTS

CN    201919063 U    8/2011
CN    103324365 A    9/2013
(Continued)

OTHER PUBLICATIONS

International Search Report and Written Opinion for International Application No. PCT/CN2019/074484, dated Apr. 16, 2019.
(Continued)

*Primary Examiner* — Brian Wilson
(74) *Attorney, Agent, or Firm* — Vivacqua Crane, PLLC

(57) ABSTRACT

An apparatus and a method for state detection, the apparatus for state detection includes one or more charge sensing elements arranged on a terminal, a charge collection circuit connected to the charge sensing element, and a state detection module connected to the charge collection circuit, the charge collection circuit is configured to generate charge and radiate the charge out through the charge sensing element, and collect reflected charge from each of the charge sensing elements to generate an induced charge value of the charge sensing element, and output the induced charge value of each of the charge sensing elements to the state detection module; the state detection module is configured to determine a state of the terminal according to the induced charge value.

13 Claims, 12 Drawing Sheets

(51) Int. Cl.
G08B 19/00 (2006.01)
G08B 21/18 (2006.01)
H01Q 1/12 (2006.01)

(52) U.S. Cl.
CPC ........ *G01N 2223/506* (2013.01); *G08B 19/00* (2013.01); *G08B 21/182* (2013.01); *H01Q 1/1257* (2013.01)

(58) Field of Classification Search
CPC .......... G01N 2223/506; H01Q 1/1257; H04M 1/72454; H04M 1/24
See application file for complete search history.

(56) References Cited

U.S. PATENT DOCUMENTS

| 2013/0324056 | A1* | 12/2013 | Maguire | ............... | H04W 4/023 |
| | | | | | 455/73 |
| 2014/0066124 | A1 | 3/2014 | Novet | | |
| 2015/0042506 | A1* | 2/2015 | Busuioc | ............... | H01Q 21/065 |
| | | | | | 342/70 |
| 2017/0097413 | A1* | 4/2017 | Gillian | .................. | G01S 7/4004 |
| 2017/0263107 | A1* | 9/2017 | Doyle | .................... | G08B 25/08 |

FOREIGN PATENT DOCUMENTS

| CN | 103593097 | A | 2/2014 |
| CN | 103605465 | A | 2/2014 |
| CN | 106055183 | A | 10/2016 |
| CN | 104903824 | B | 10/2017 |
| CN | 110113468 | A | 8/2019 |
| WO | 2019/149276 | A1 | 8/2019 |

OTHER PUBLICATIONS

Chinese Office Action in connection with Chinese Application No. 201810103596.6, dated May 28, 2020.
European Patent Office. Extended European Search Report for EP Application No. 19748408.2, dated Oct. 14, 2021, pp. 1-11.

* cited by examiner

APPARATUS AND METHOD FOR STATE DETECTION

CROSS-REFERENCE TO RELATED APPLICATION

This application is a national stage filing under 35 U.S.C. § 371 of international application number PCT/CN2019/074484, filed Feb. 1, 2019, which claims priority to Chinese patent application No. 201810103596.6 filed Feb. 1, 2018. The contents of these applications are incorporated herein by reference in their entirety.

TECHNICAL FIELD

The present application relates to, but not limited to, terminal technology, and in particular, to an apparatus and a method for state detection.

BACKGROUND

Currently, the usage scenarios of mobile terminals are becoming more and more complicated, and the requirements of the industry and users on the intelligent performance of the terminals are also increasing. In the existing art, the state of the terminal is generally detected by an acceleration sensor, a gravity sensor, a gyroscope, and so on. Therefore, it is usually only feasible to detect the terminal in a moving state, but cannot detect the terminal in a stationary state.

SUMMARY

At least one embodiment of the present application provides an apparatus and a method for state detection to implement state detection of terminal.

In order to achieve the purpose of the present application, at least one embodiment of the present application provides an apparatus for state detection, including:

one or more charge sensing elements arranged on a terminal, a charge collection circuit connected to the charge sensing element, and a state detection module connected to the charge collection circuit, wherein, the charge sensing element is configured to radiate charge generated by the charge collection circuit, and transmit reflected charge to the charge collection circuit;

the charge collection circuit is configured to generate charge and is configured to radiate the charge out through the charge sensing element, and collect the reflected charge from each of the charge sensing elements to generate an induced charge value of the charge sensing element, and output the induced charge value of each of the charge sensing elements to the state detection module;

the state detection module is configured to determine a state of the terminal according to the induced charge value.

An embodiment of the present application provides method for state detection, including:

generating charge and radiating the charge through one or more charge sensing elements;

collecting the reflected charge from each of the charge sensing elements to generate an induced charge value of the charge sensing element;

determining a state of the terminal according to the induced charge value.

Compared with the existing art, in at least one embodiment of the present application, by detecting the induced charge value to determine the state of the terminal, it is possible to detect states of a stationary terminal.

Additional features and advantages of the disclosure will be set forth in the description which follows, and in part will be obvious from the description, or may be learned by the practice of the disclosure. The objects and other advantages of the present disclosure can be realized and obtained by the structures particularly pointed out in the description, claims and drawings.

BRIEF DESCRIPTION OF DRAWINGS

The drawings are provided for a further understanding of the technical solutions of the present application, and constitute a part of the description. The drawings and the embodiments of the present application are used to explain the technical solutions of the present application, and do not constitute limitation on the technical solutions of the present application.

FIG. 6($b$) is a schematic diagram of a part of a terminal being suspend in midair according to an embodiment of the present application;

DETAILED DESCRIPTION

Objects, technical solutions and advantages of the present disclosure will be clearer from a detailed description of embodiments of the present application in conjunction with the drawings. It is to be noted that if not in collision, the embodiments and features therein in the present application may be combined with each other.

The steps shown in the flowcharts of the figures can be performed in a computer system such as a set of computerexecutable instructions. And, although a logical order is shown in the flowchart, in some cases, the steps shown or described may be performed in an order different from the shown logical order.

If a current placement location of a terminal, a platform on which the terminal is placed, whether the terminal is in a safe state and objects which the terminal is close to, can be detected or sensed in real time, many intelligent applications and protections will be implemented. In an embodiment of the present application, the charge sensing element placed inside the terminal is configured to radiate electric charge, and collects a reflected charge to generate an induced charge value, and determines the state of the terminal according to the induced charge value.

Figure 1:
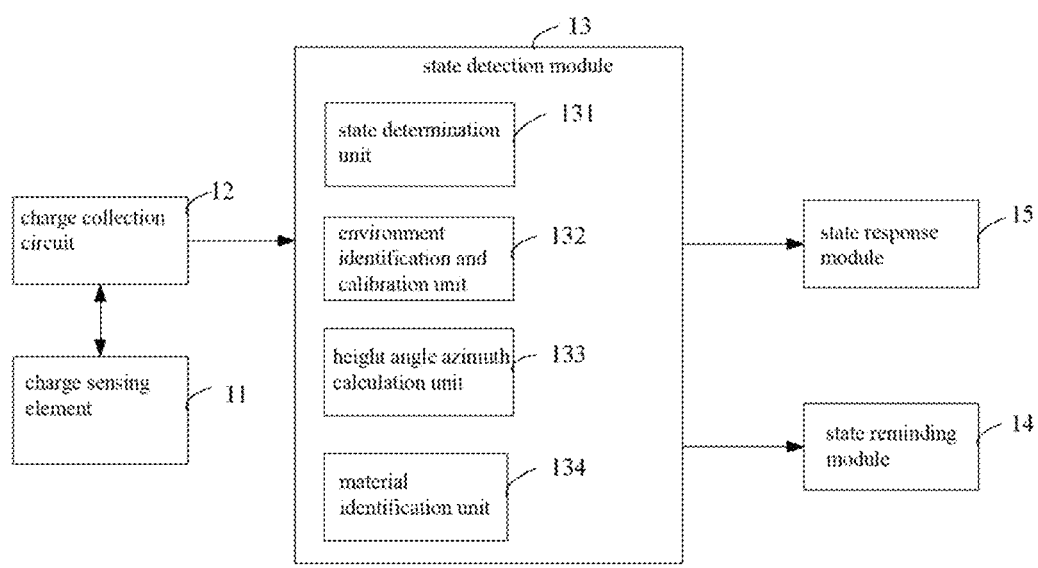
FIG. 1 is a block diagram of an apparatus for state detection provided by an embodiment of the present application.

FIG. 1 is a structural diagram of an apparatus for state detection provided by an embodiment of the present application. As shown in FIG. 1, apparatus for state detection includes one or more charge sensing elements 11 arranged on the terminal, a charge collection circuit 12 connected to the charge sensing element 11, a state detection module 13 connected to the charge collection circuit 12, a state reminding module 14 connected to the state detection module 13 and a state response module 15 connected to the state detection module 13.

Figure 2:
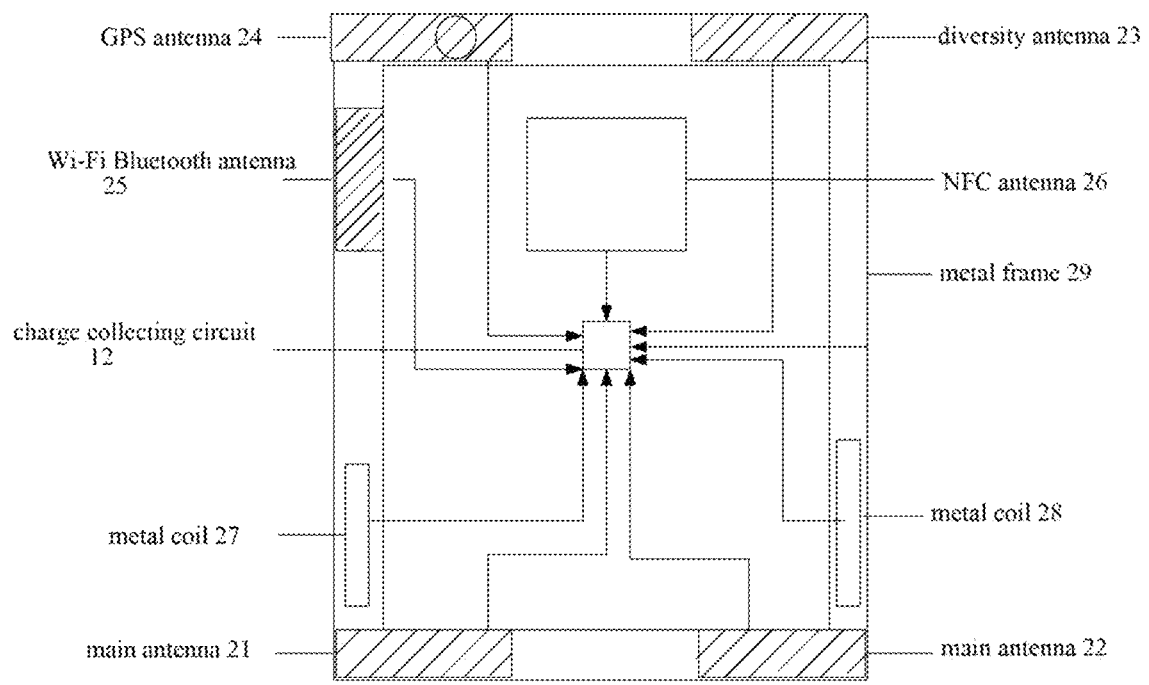
FIG. 2 is a block diagram of a charge sensing element provided by an embodiment of the present application.

The charge sensing element 11 is used to radiate the charge generated by the charge collection circuit 12 and transfer reflected charge to the charge collection circuit 12. Wherein, the existing elements of the terminal can be directly used as the charge sensing element, or some conductive elements can be separately provided as the charge sensing element. For example, the charge sensing element 11 may include at least one of the following: an antenna of the terminal, a metal shell of the terminal, a metal frame of the terminal, a metal trace or a coil arranged on a printed circuit board on the terminal. The antennas of the terminal may include antennas of wireless cellular communication (such as 2G/3G/4G antennas), antennas of WI-FI and Bluetooth wireless communication, GPS receiving antennas, and antennas of NFC (Near Field Communication) sensing. The charge sensing elements 11 can be distributed at the four corners or sides, the back shell, the frame, of the terminal and so on. The charge sensing element 11 is connected to each channel position of the charge collection circuit 12 through a shielding protection coaxial line, microstrip line, or stripline with a certain width and length. An implementation of the charge sensing element 11 is shown in FIG. 2, which includes a main antenna 21, a main antenna 22, a diversity antenna 23, a GPS antenna 24, a WI-FI Bluetooth antenna 25, an NFC antenna 26, a metal coil 27, a metal coil 28 and a metal frame 29, the distribution position thereof may be the four corners of the terminal, such as the main antenna 21, the main antenna 22, the diversity antenna 23 and the GPS antenna 24; the distribution position thereof can also be the side of the terminal, such as the WI-FI Bluetooth antenna 25, the metal coil 27, and the metal coil 28; the distribution position thereof can also be the back shell of the terminal, such as the NFC antenna 26. It should be noted that the charge sensing element 11 may only include one or more types thereof shown in FIG. 2. In addition, the position of the charge sensing element 11 is not limited to the position shown in FIG. 2, and other positions may be possible. In addition, the area occupied by each charge sensing element 11 is greater than 0, which is not a single point. In this embodiment, the charge sensing element 11 and the charge collection circuit 12 are connected in a star shape as shown in FIG. 2, thus can detect the sensing state information of the four corners and the left and right sides of the terminal at the same time to achieve a protection of 360-degree without dead angle. It should be noted that, in other embodiments, the charge sensing element 11 may be arranged only at a partial position.

The charge collection circuit 12 is configured to generate charge and radiate them out through the charge sensing element 11, collect the reflected charge from each of the charge sensing elements 11, generate the induced charge value of the charge sensing element 11, and output the induced charge value of each charge sensing element to the state detection module 13. The charge collection circuit 12 is configured to use each charge sensing element as a reference plane, and the platform, human body, and object contacted by the terminal serve as a sensing plane, by measuring the change in charge value between the two planes, it is determined whether a corresponding area of the terminal leaves the contacted sensing plane.

Figure 3:
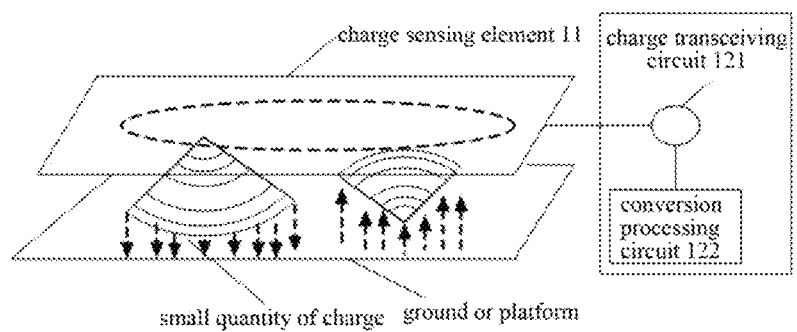
FIG. 3 is a schematic diagram of charge sensing provided by an embodiment of the present application.

In an embodiment, as shown in FIG. 3, the charge collection circuit 12 includes a charge transceiving circuit 121 and a conversion processing circuit 122, wherein, the charge transceiving circuit 121 can emit charges and receive charges, the charge transceiving circuit 121 is configured to radiate a small quantity of charge signals to the outside, and receive the reflected charge signals; the conversion processing unit 122 is configured to collect the reflected charge, generate an induced charge value through analog-to-digital conversion and stores it, for example, in a register. The conversion processing unit 122 includes, for example, a digital and analog gain amplifier.

Figure 4:
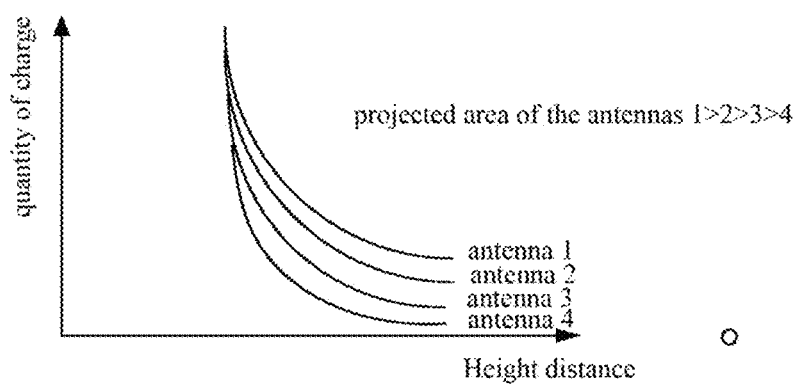
FIG. 4 is a graph of the change in charge sensing value of an antenna at different distances provided by an embodiment of the present application.

When the corresponding area of the terminal leaves the placement platform, the quantity of charge collected by the charge collection circuit 12 will decrease sharply; when the terminal is close to a certain platform or object, the quantity of charge collected by the charge collection circuit 12 will increase sharply, and the quantity of change in charge changes from fF level to pF level, that is, the induced charge value is related to the distance and the material, and related to the quantity of charge radiated out, the quantity of charge radiated out. As shown in FIG. 4, when the distance decreases, the quantity of charge increases sharply. In addition, at a same distance, the projected area is different, and the quantity of charge is also different, the larger the projected area, the more the quantity of charge, an antenna is taken as an example in FIG. 4 to illustrate the change of the charge sensing value of the charge sensing elements with different projected areas at different distances. The changes of other types of charge sensing elements with the projected area and distance are similar, and will not be repeated here. Taking the charge sensing element installed in screen of the terminal as an example, when the terminal is placed horizontally, the projected area of the charge sensing element is relatively large, and when the terminal is placed vertically, the projected area of the charge sensing element is relatively small, when the terminal is tilted, the projected area of the charge sensing element is between the projected areas of the horizontally placed terminal and the vertically placed terminal. Taking the charge sensing element arranged on the side (the side here refers to the longer sides of the rectangle) of the terminal as an example, when the terminal is placed horizontally or vertically with the bottom or head, the projected area of the charge sensing element arranged at the side is very small, when the terminal is placed vertically on the side, the projected area of the charge sensing element on the side is large. Corresponding charge sensing value tables under different materials, distances and different sensing areas can be established in advance. In simplified situations, for example, when the terminal is stationary and in direct contact with the object, the material of the object can be determined directly from the induced charge value.

The detecting distance of the charge collection circuit 11 can be changed, the quantity of charge radiated by the charge collection circuit is different, and the distance it can detect is different, generally, the larger the quantity of charge, the greater the detection distance. The detection distance and collection sensitivity are determined by control parameters, which can be modified according to user needs, a detection distance can be preset, if the object cannot be detected at a current detection distance, the detection distance can be increased for re-detecting, such that the object can be directly detected or a maximum detection distance can be reached. The detection distance can be set higher than the current terminal height. For example, the detection distance can be set from 0 MM to 120 CM (here is only an example, other values are also possible), specifically, the detection distance can be changed by adjusting the gain of the digital and analog gain amplifier in the charge collection circuit 11, for example, the greater the gain, the greater the detection distance.

The state detection module 13 determines the state of the terminal according to the induced charge value output by the charge collection circuit 12, specifically, can include at least one of the following:

determining whether the terminal is in a safe state according to the induced charge value;

determining the screen orientation of the terminal according to the induced charge value;

determining the material of currently contacted or approached by the terminal according to the induced charge value;

determining the height at which the terminal is currently located, the angle at which the terminal is currently located, and the orientation at which the terminal is currently located according to the induced charge value.

In an alternative embodiment, the state detection module 13 includes a state determination unit 131, an environment identification and calibration unit 132, a height angle azimuth calculation unit 133, and a material identification unit 134, wherein:

The state determination unit 131 is used to perform at least one of the following:

Determining whether the terminal is in a safe state according to the induced charge value;

Determining the screen orientation of the terminal according to the induced charge value.

Wherein, a safe state condition can be set in advance, and when the safe state condition is satisfied, the terminal is determined to be in a safe state, for example, the safe state condition can be set as the terminal being in a static state, and at least three designated charge sensing elements are in contact with the medium (non-air, such as the ground, desktop, pocket, human hand, etc.), or, the safe state condition can be set as the terminal being in a stationary state, and the charge sensing elements at the four corners of the terminal are in contact with the medium (non-air), the charge sensing elements at the four corners of the terminal may be four charge sensing elements on a screen surface of the terminal, or four charge sensing elements on a back of the terminal, and so on. The safe state conditions can be set as required. In addition, an unsafe state condition can also be set. When the unsafe state condition is satisfied, the terminal is determined to be in an unsafe state, and a reminder can be issued at this time. The unsafe state condition is, for example, that the area where one or more charge sensing elements of the terminal is in a suspended state. Wherein, the medium contacted in the suspended state is air.

In an embodiment, the state determination unit 131 is also used to determine whether each part of the current terminal has left the platform, or is in a free fall, or is about to touch the ground. The states of the terminal in the above three processes are checked. Comparing the induced charge value with a pre-stored parameter model value, when a determining threshold is reached, it can be determined that a current corresponding area or part of the terminal is in a corresponding state.

In an embodiment, the state determination unit 131 is further configured to determine the motion state type of the terminal, and the motion state type may include: up-throwing, flat-throwing, down-throwing, flipping motion, etc., motion state model of each motion state type can be pre-stored, after obtaining motion parameters, determining the motion state type of the terminal by comparing with the motion state model. Specifically, the motion parameters (such as acceleration, angular velocity, etc.) are obtained according to an acceleration sensor of the terminal, etc., by comparing with the pre-stored typical motion model, falling state (such as up-throwing, flat-throwing, down-throwing and other external forces causing non-free-falling motion) of the terminal can be accurately determined, so as to determine whether the terminal is in an abnormal state.

In an embodiment, detecting whether the terminal is placed with the screen facing upwards or the back is facing upwards, if it is in a falling state, detecting whether the screen is landing on the ground or the back is landing on the ground, specifically, it can be determined by material identification, calculation of height, angle, and orientation. In an embodiment, the charge sensing element is provided at least at the screen and back of the terminal, one way to determine the orientation of the screen of the terminal is: obtain the induced charge values of the charge sensing element at the screen of the terminal and the charge sensing element at the back of the terminal, if the induced charge value of the charge sensing element placed at the screen of the terminal is greater than the induced charge value of the charge sensing element placed at the back of the terminal, the terminal is in a state where the screen is facing downward. If the induced charge value of the charge sensing element placed at the back of the terminal is greater than the induced charge value of the charge sensing element placed at the screen of the terminal, the terminal is in a state with the screen face up. The determining method here is only an example, and other methods can also be used for determining. It should be noted that the induced charge value of each charge sensing element can be corrected to remove the induced charge value generated by the reflection of the terminal itself. The induced charge value reflected by the terminal itself which is received by each charge sensing element can be determined and stored in advance. The corrected induced charge value of the charge sensing element is obtained by subtracting the induced charge value generated by the terminal itself from the induced charge value of the charge sensing element. Certainly, it's okay not to make corrections.

After the environment identification and calibration unit 132 receives the notification from the material identification unit 134 (at this time, the material identification unit cannot determine the material of the object currently contacted or approached by the terminal), receiving the information of the material of the object currently contacted or approached by the terminal input by the user, and storing the current induced charge value and the information of the material to a correspondence table between the induced charge value and the material, alternatively, the correspondence table between the induced charge value and the material is updated by using the current induced charge value and the information of the material. Specifically, for example, if the terminal is in contact with a new material, the new material and its corresponding induced charge value can be stored at this time. For another example, the terminal is in contact with existing materials (existing materials input by users), however, the induced charge value changes, and the current induced charge value can be used to replace the induced charge value corresponding to the material in the correspondence table between the induced charge value and the material, i.e., to perform calibration.

Since the terminal placement location environment is relatively complicated, when the terminal is placed in a certain location, a current environment or platform is identified, and a placement platform of the terminal is identified, such as a desktop, different hands, pockets, air, ground, etc. That is, the induced charge value brought by the object contacted by the terminal is collected and stored. Whenever the environment changes, the collection must be repeated to obtain the induced charge value of the object currently contacted or approached by the terminal. In addition, if there is a mobile phone case on the terminal, the induced charge values when the terminal is with and without the mobile phone case can be measured to determine the induced charge value reflected by the mobile phone case, thus the induced charge value can be corrected (by subtracting the induced charge value reflected by the mobile phone case), and then the state of the terminal can be determined based on the corrected induced charge value.

The induced inductance value of the objects contacted by the terminal daily are collected and stored, such as metal materials, wood products, glass materials, leather products, fabrics, human hands, plastics, air at different temperatures and humidity, etc., since the dielectric constant of each material is different, when the terminal is in contact with the material, the induced charge value will also be different, and a set of conventional values can be stored in advance. If the terminal is currently approaching an object, by comparing with the stored induced charge value of each medium, the medium currently contacted or approached by the terminal can be determined, if the terminal is exposed to changes in the environment, the environment identification and calibration unit 132 will also collect and store the induced charge value of the new environment.

The height angle azimuth calculation unit 133 is used to detect the height, angle and orientation of the terminal. When the terminal is in a certain plane, if a part of the terminal, such as the bottom, is placed in a suspended state, a height detecting mode can be turned on to measure a height value of the current terminal relative to the ground plane. If the height value is greater than a safety threshold, the state reminding module 14 will be activated. When the detected height value continues to change, it can be determined that the terminal is currently in a falling process, a terminal landing angle and azimuth calculation mode will be started, so that a landing angle of the terminal, and a landing orientation of the terminal are detected. For example, if the terminal is divided to have four top corners of ABCD, two directions of screen face and back face, and each top corner have different inclination angles, such as 30 degrees, 45 degrees, 60 degrees, and 90 degrees. Through the induced charge values of the charge sensing elements placed at the four corners of the terminal and the charge sensing elements at the front and back sides of the terminal during the falling, a current angle and azimuth value of the terminal can be calculated. If the charge sensing elements placed at the four corners of the terminal detect a same (or substantially the same) induced charge value, and the multiple detected values are same in a trend during the falling process, then it can be calculated that the terminal is falling horizontally in a 0-degree. In addition, if a charge sensing value of the charge sensing element placed at the screen of the terminal is greater than a charge sensing value of the charge sensing element placed at the back of the terminal, it can be determined that the screen surface of the terminal is currently facing downward. Generally, the projected areas of the charge sensing elements at the screen and the back in comparing are the same.

Similarly, when the heights detected by the charge sensing elements placed at the four corners of the terminal are inconsistent, the difference in height detected by the four corners can be used to calculate the inclination of the terminal currently landing.

In addition, when a corner of the terminal is about to land on the ground, a maximum value of the induced charge at this position can be measured by the charge sensing element placed at that corner, that is, the distance of this corner to the ground will be the shortest and is in a constant changing trend, it can be determined that the terminal will touch the ground first with this corner.

One calculation method is: by recording the value of time difference T from emission of the charge signal to reception of the charge signal reflected from an obstacle, the distance to the detected obstacle can be calculated by $L=VT/2$, so to calculate the height of the terminal before landing, a formula $h=\frac{1}{2}g^2$ can be used to calculate a landing time, and a formula $V=gt$ can be used to calculate a maximum speed before landing.

The material identification unit 134 is configured to search from a preset correspondence table between the induced charge value and the material according to the induced charge value, and determine the material of the object currently contacted or approached by the terminal. Alternatively, obtaining the value of time difference from the emission of the charge to the reception of the reflected charge, and determining the distance between the terminal and the object according to the value of time difference, according to the induced charge value and the distance, a preset correspondence table of the induced charge value, distance, and material is searched to determine the material of the object currently contacted or approached by the terminal. Two modes can be set, one is direct contact detecting mode, the other is spaced detecting mode, in direct contact detecting mode, searching from the preset correspondence table between induced charge value and material; in the spaced detecting mode, searching from the preset correspondence table of induced charge values, distances, and materials.

In one embodiment, the material identification unit 134 notifies the environment identification and calibration unit 132 when the material of the object currently contacted or approached by the terminal is unable to be determined.

When the terminal is placed on a platform, such as different desktops, different hands, pockets, etc., there will be different induced charge values, obtain the induced charge value and compare it with the pre-stored induced charge value to determine the material of the object contacted or approached by the terminal.

There are two cases here, material identification in direct contact and material identification in separated state, the material identification in direct contact means that the terminal directly recognizes the material of the contacted object, the distance between the terminal and the contacted object is close to 0, such as placing the phone on a table, book, trouser pocket, etc., at this time, set the terminal to a 0 distance mode or an ultra-near mode, if a reflected charge signal can be detected in this mode, it can be determined as direct contact with the material, and search from the table based on the induced charge value to identify which material or object is in direct contact with. It should be noted that the detecting mode of a larger distance may be directly adopted without setting to the 0-distance or ultra-near mode. At this time, the value of time difference T from the emission of the charge signal to the reception of the charge signal reflected from an obstacle is very small, and it can also be determined that the terminal is in directly contact with the object.

For example, in the case of material identification in direct contact, the charge sensing elements at the four corners of the terminal each measure the induced charge values C1, C2, C3, C4 of each contacted object, if C1, C2, C3, and C4 are the same, and the value is within a parameter threshold of a certain material model, it can be determined that the terminal contacts the corresponding material, and the four corners are in good contact with the corresponding material. If the four values are different, corresponding model values can be found for C1-C4, it can also be determined that the terminal and the object are in direct contact, but the material in contact with each corner is different. If C1 and C2 are the same, and are the same as the induced charge value corresponding to the book medium, C3 and C4 are the same, and are the same as the induced charge value corresponding to the wooden desktop medium, it can be determined that part of the terminal is placed on a book and part is placed on a desktop.

The material identification in separated state means that the terminal and the object to be detected are not in direct contact, and an air medium is in between. The air itself does not reflect the charge signal, when the charge emitted by the terminal encounters an obstacle, the obstacle will reflect the charge signal. Due to different materials and different dielectric constants of the obstacle, the quantity of charges reflected in per unit distance will also be different. Assuming that a transmission speed of charge in the air is V, and a round trip time $\Delta t$ for a single emission and reception per unit distance $\Delta L$, the relationship is $\Delta L = V\Delta t/2$, and thus the average transmission speed V can be calculated, as long as the value of time difference T from emission of the charge signal to reception of the charge signal reflected from an obstacle is recorded, the value of distance to the detected obstacle can be calculated by $L=VT/2$.

After the distance is calculated, different materials have different dielectric constants, and the charge value reflected at the same distance L is also different. The relevant factor parameter of the material is ό, and an unit collected projection mapping area is S, then a charge value received and collected by the receiver is $C=S\acute{o}/L$, L is determined by the collected induced charge value C and the value of time difference T from emission of the charge signal to reception of the charge signal reflected from an obstacle, while the terminal is stationary, S is a fixed value, therefore, a correspondence table of induced charge values, distances, and materials can be established in advance, and after obtaining the induced charge value and distance, a corresponding material can be determined. A corresponding relationship table is shown in Table 1 below. In this table, the induced charge value of material A1 at distance L1 is C11, the induced charge value at distance L2 is C12, and the induced charge value at distance L3 is C13. If the induced charge value obtained during detection is C13 and the distance is L3, the current material is thus determined to be A1. In addition, when different detection distances are set, the induced charge value will also be different, therefore, a correspondence table of the induced charge values, distances, and materials at different detection distances can be established.

TABLE 1

Correspondence table of induced charge value, distance, material

|  | material A1 | material A2 | material A3 |
| --- | --- | --- | --- |
| L1 | C11 | C21 | C31 |
| L2 | C12 | C22 | C32 |
| L3 | C13 | C23 | C33 |

In an embodiment, since the detection distance of the charge collection circuit 12 is variable, the detection can be performed firstly in a direct contact detecting mode. The detection distance in the direct contact detecting mode is less than a preset value, for example, less than 5 mm, at this time, only objects directly in contact with the terminal can be detected, not objects in separated. Therefore, it is not necessary to calculate the distance, and the induced charge value can be directly obtained, and the material of the object can be determined according to the induced charge value. If the object is not detected in the direct contact detecting mode, then change to a spaced detecting mode for detection. At this time, the detection distance can be set to a default value. If the object cannot be detected under the default value, the detection distance may be gradually increased until the object can be detected, or directly set the detection distance to a maximum value for detection.

In another embodiment, in the case of material identification in separated state, two kind of detections can be carried out, one of which is short-distance detection, if there is no object, it can be determined that the terminal is currently in a suspended state, and another long-distance detection is carried out, if there is an object of a certain material in an effective measuring range, and a induced charge value thereof is the same as induced charge value in the pre-stored material model, it can be determined that the terminal is in contact with the certain material. Under this circumstance, a valid value is detected at a certain corner of the terminal, it can be determined that the terminal is statically placed on the material, and part of which is suspended in midair. If there is not a valid value of four corners in the first detection, and the second detection value continues to change, it can be determined that the terminal is in a suspended state or falling state.

In another embodiment, in order to prevent the induced charge value detected under different states from being the same, resulting in misjudgement of the system, such as when the terminal is in direct contact with an object A, the induced charge value is C1, and when the terminal is in direct contact with another object B, the induced charge value is C2, but when the terminal is 10 CM above the object B, the detected induced charge value is also C1, in this case, secondary or multiple collections may be carried out. The distance for the first detection is very short, such as within 5 MM, if no suitable material is matched within this distance, the detection distance will be enhanced in secondary detection or multiple detections to obtain the induced charge value C1. Since the induced charge value C1 is not collected in the first collection, the approached object is not the object A.

In an embodiment, the state detection module 13 sends a reminding instruction to the state reminding module 14 when it is determined that the user needs to be reminded according to a state of the terminal;

The state reminding module 14 executes a reminding operation after receiving the reminding instruction sent by the state detection module 13. The reminding operation may be one or more of the following: displaying a prompt information, performing a voice prompt, performing a vibration prompt, and performing a prompt of flashing indicator light. For example, when the terminal is in an unsafe state, such as when the terminal is partially suspended or tilted, the terminal issues an alarm to inform the user, so that the user can stop the falling or can place the terminal on a stable platform in time.

In another example, when the terminal is in a state of unsafe sliding or moving, the terminal will also make a signal prompt according to a current moving state, and may even display a current information of height-to-ground in real time. After noticing the prompt message, the user will know that the terminal is currently in an unstable state and will make a position adjustment to the terminal.

In an embodiment, the state detection module 13 sends information of the state of the terminal to the state response module 15;

The state response module 15 enters a mode corresponding to the state of the terminal when a mode of the terminal is necessary to be changed according to the state of the terminal. In this embodiment, an intelligent adaptive induction response can be made to different real-time states where the terminal is in.

Wherein, the state of the terminal may include a current motion state and environment state of the terminal, and may also be material properties of the object contacted or approached by the terminal.

When a change in the state of the terminal is detected, for example, the position of the platform where the terminal is placed changes, the placement height of the terminal changes, the position in the pocket, the posture of holding, the state of being close to or away from the face (which can be determined by calculating the distance from the face), etc., the state response module 15 will enter a specific mode according to user's settings or default settings, such as mute mode, airplane mode, screen off mode, screen always on mode, and power saving mode.

When it is detected that the material of the object contacted by the terminal changes, if the material is a specified material matching a material in a material model library, the terminal will also make corresponding state adjustments. For example, when the terminal is placed on a desk, it may be in silent vibration mode, when the terminal is placed on a conference room table, it can be in airplane mode, when the terminal is placed on a table in a cafeteria, it may be in an enhanced ring mode, when the terminal is placed on a bed, it may be in a sleep-do-not-disturb mode. The mode corresponding to each state needs to be set in advance. Corresponding induced charges for desks, conference tables, canteen tables, and beds can be pre-measured and stored.

Figure 5:
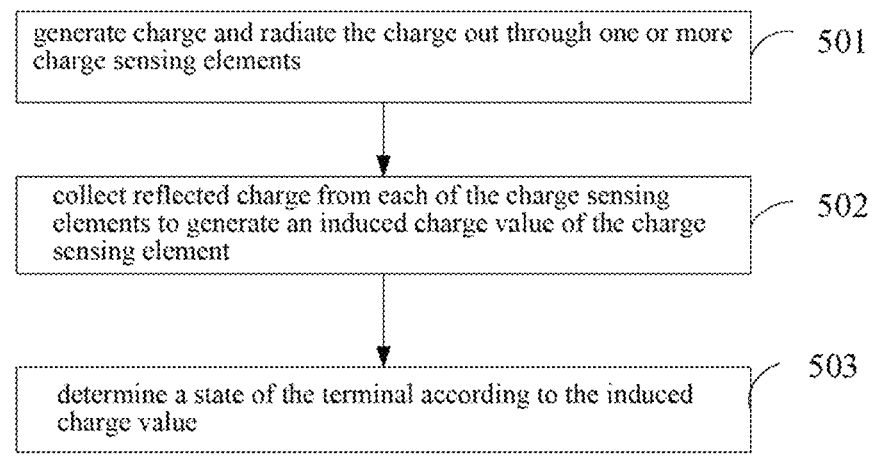
FIG. 5 is a flowchart of a method for state detection provided by an embodiment of the present application.

An embodiment of the present application provides a method for state detection, as shown in FIG. 5, including:

Step 501: generating charge radiate the charge out through one or more charge sensing elements;

Step 502: collecting the reflected charge from each of the charge sensing elements to generate an induced charge value of the charge sensing element;

Step 503: determining a state of the terminal according to the induced charge value.

In an embodiment, the determining the state of the terminal according to the induced charge value includes at least one of the following:

Determine whether the terminal is in a safe state according to the induced charge value; for specific process of determination, please refer to the related description in the foregoing apparatus embodiments.

Determine a screen orientation of the terminal according to the induced charge value; for example, obtain the induced charge values of the charge sensing elements at the screen of the terminal and the charge sensing elements at the back of the terminal, if the induced charge value of the charge sensing element placed at the screen of the terminal is greater than the induced charge value of the charge sensing element placed at the back of the terminal, the terminal is in a state where the screen face is facing downward. If the induced charge value of the charge sensing element placed at the back of the terminal is greater than the induced charge value of the charge sensing element placed at the screen of the terminal, the terminal is in a state where the screen face is facing upward.

The material of the object currently contacted or approached by the terminal is determined according to the induced charge value.

In an embodiment, the material of the object currently contacted or approached by the terminal is determined according to the induced charge value includes:

According to the induced charge value, search from a preset correspondence table between the induced charge value and the material, and determine the material of the object currently contacted or approached by the terminal;

Or, get the value of time difference from the emission of the charge to the reception of the reflected charge, determine a distance between the terminal and the object according to the value of time difference, and according to the induced charge value and the distance, search from a preset correspondence table of the induced charge value, distance, and material to determine the material of the object currently contacted or approached by the terminal.

That is, firstly set to a direct contact detecting mode (the detection distance is very short at this time, such as less than 5 mm) for detection, if an object is currently detected, the material of the object currently contacted or approached by the terminal is directly determined according to the induced charge value, if no object is detected, change the detecting mode and use a preset detection distance for detection. At this time, the distance between the terminal and the object is determined according to the value of time difference from the emission of the charge to the reception of the reflected charge and the transmission speed V of the charge in air, then, search from the preset correspondence table of the induced charge value, distance, and material to determine the material of the object currently contacted or approached by the terminal. Certainly, directly using a preset detection distance for detection is possible, if a obtained value of distance is small, thus indicating direct contact, and search from the correspondence table between the induced charge value and the material to obtain the current corresponding material.

In an embodiment, the method further includes: obtaining the induced charge value of the object contacted by the terminal when the terminal is stationary, and storing the material of the object and the induced charge value. This step is to determine the environment when the terminal is stationary, when the terminal is in a moving state in subsequent process, for example, in a falling state, since the material is known, may directly search from the correspondence table of the induced charge value, material, and distance to obtain a distance value of each induced charge element.

In an embodiment, the method further includes: when the material of the object currently contacted or approached by the terminal cannot be determined, receiving information of the material of the object currently contacted or approached by the terminal input by the user, storing a current induced charge value and the information of the material into the correspondence table between the induced charge value and the material, or, the correspondence table between the induced charge value and the material is updated by using the current induced charge value and the information of the material.

In an embodiment, the method further includes: if reflected charge is not collected by the charge sensing element, increasing the detection distance to regenerate the charge is radiated through one or more charge sensing elements. That is, if the object cannot be detected at the current detection distance, for example, the terminal is high from the ground, at this time, the detection distance can be increased for detection.

In an embodiment, the method further includes: performing a reminding operation when it is determined that the user needs to be reminded according to the state of the terminal. the state needs to be reminded may be set in advance, and performing the reminding operation when a corresponding state is met. The reminding operation may be one or more of the following: displaying a prompt information, performing a voice prompt, performing a vibration prompt, and performing a prompt of flashing indicator light. For example, when the terminal is in an unsafe state, such as when it is partially suspended or tilted, the terminal sends an alarm to inform the user so that the user can stop a coming fall or place the terminal on a stable platform in time.

In an embodiment, the method further includes: according to the state of the terminal and a preset correspondence between the state of the terminal and the function mode, entering a function mode corresponding to the state of the terminal. For example, when the terminal is placed on a desk, it may be in silent vibration mode, when the terminal is placed on a conference room table, it can be in airplane mode, when the terminal is placed on a table in a cafeteria, it may be in an enhanced ring mode, when the terminal is placed on a bed, it may be in a sleep-do-not-disturb mode. The mode corresponding to each state needs to be set in advance. Corresponding induced charges for desks, conference tables, canteen tables, and beds can be pre-measured and stored. In another example, when the terminal is close to the specified material, identification and payment will be performed, for example, scanning a QR code, etc., without requiring the user to manually open a scanning software for scanning, which is convenient for the user.

EXAMPLE ONE

Figure 6A:
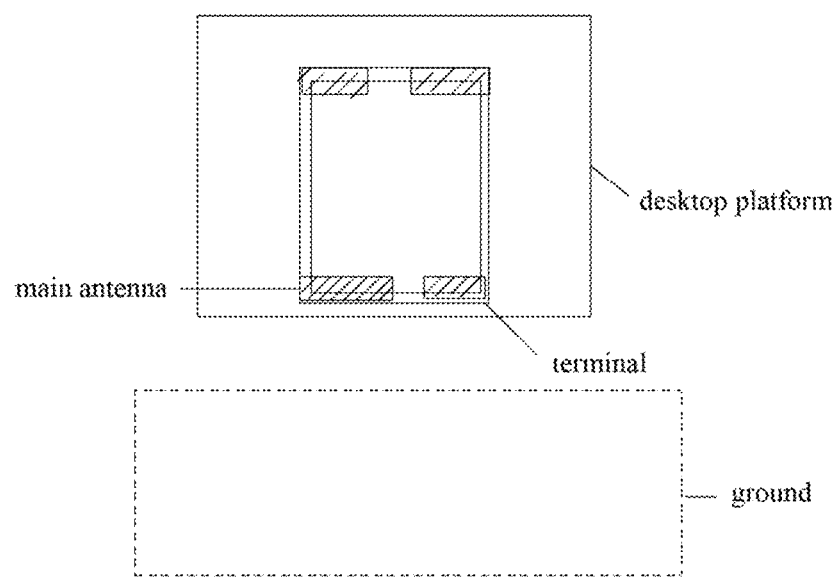
FIG. 6($a$) is a schematic diagram of a safe placement of a terminal provided by an embodiment of the present application.
Figure 6B:
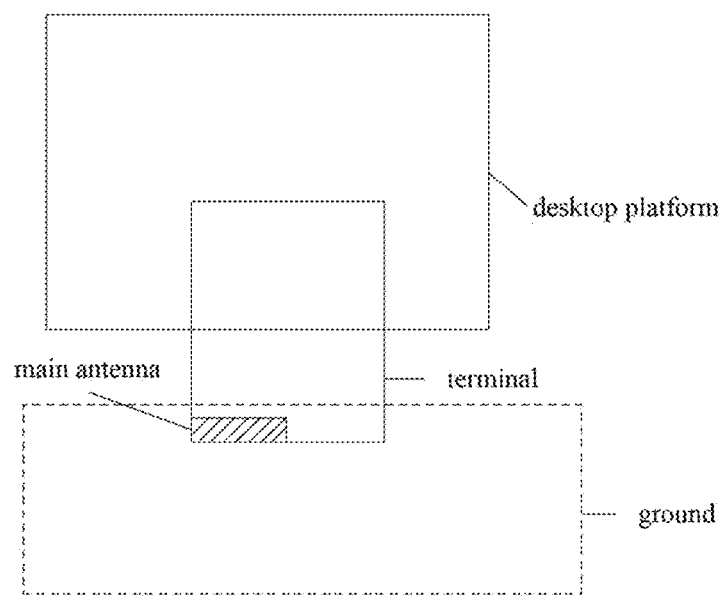

As shown in FIG. 6(*a*), the charge sensing element includes antennas at the four corners of the terminal, when the terminal is placed on the desktop as a whole, since an entire projection area of the antennas at the four corners of the terminal is on the desktop, the charge collection circuit will detect a relatively large induced charge value, and the induced charge value is the same as the induced charge value corresponding to a pre-stored desktop material attribute, it can be determined that the terminal is in a state of being safely placed on the desktop.

As shown in FIG. 6(*b*), if a certain charge sensing element at the bottom of the terminal detects a very small induced charge value, such as 1 fF, the system will automatically adjust an amplification gain to detect the terminal's distance to ground. If the distance to the ground is greater than a preset threshold, such as 0.5 meters, it can be determined that the bottom of the terminal is currently in a suspended state.

EXAMPLE TWO

Figure 7:
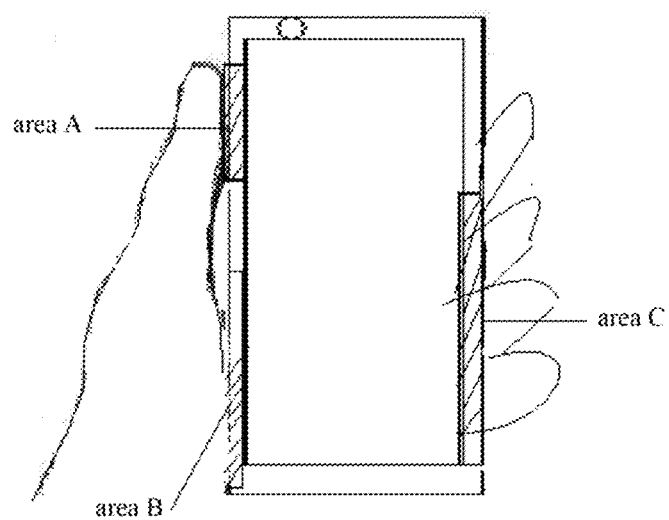
FIG. 7 is a schematic diagram of a terminal being securely held provided by an embodiment of the present application.
Figure 8:
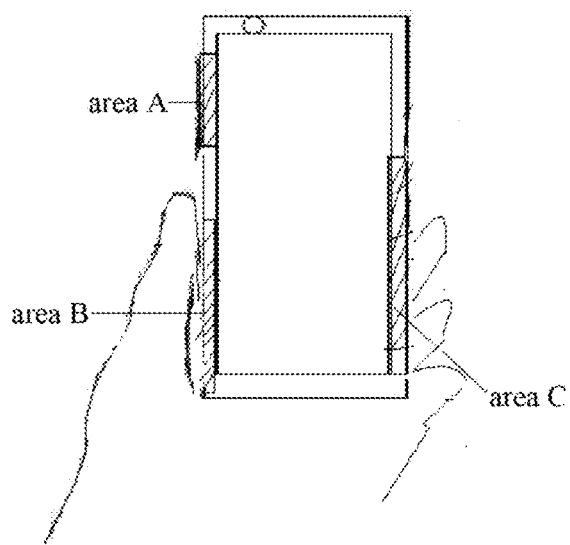
FIG. 8 is a schematic diagram of a terminal being insecurely held provided by an embodiment of the present application.

As shown in FIG. 7, when the terminal is placed on human hand, the induced charge values in the three areas A, B, and C are obtained, and if the terminal is in contact with the human hand in the three areas A, B, and C, it can be recognized that the terminal is in a normal range of griped by hand, the terminal is detected to be placed on the user's hand thus determining that the terminal is in a three-point steady and safe state, If the terminal moves on the human hand, turning into a position shown in FIG. 8, at this time, the induced charge value in the area A is detected to be the same as a corresponding induced charge value of a pre-stored air medium, not a human hand, and the areas B and C are still in the human hand, this state does not belong to a three-point steady state, at this time, an alarm can be sent.

EXAMPLE THREE

Figure 9:
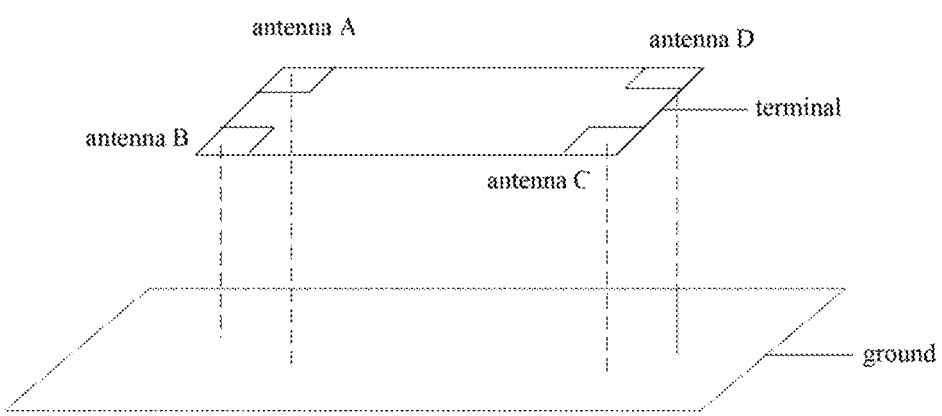
FIG. 9 is a schematic diagram of a horizontally dropping terminal provided by an embodiment of the present application.

As shown in FIG. 9, in this embodiment, when the terminal is determined to be in a free-falling state, the distance between the terminal and the ground is detected, and the changes of the induced charge values of the charge sensing elements located at the four corners of the terminal is a relatively equal value, determining that the terminal has landed on the ground horizontally.

EXAMPLE FOUR

Figure 10:
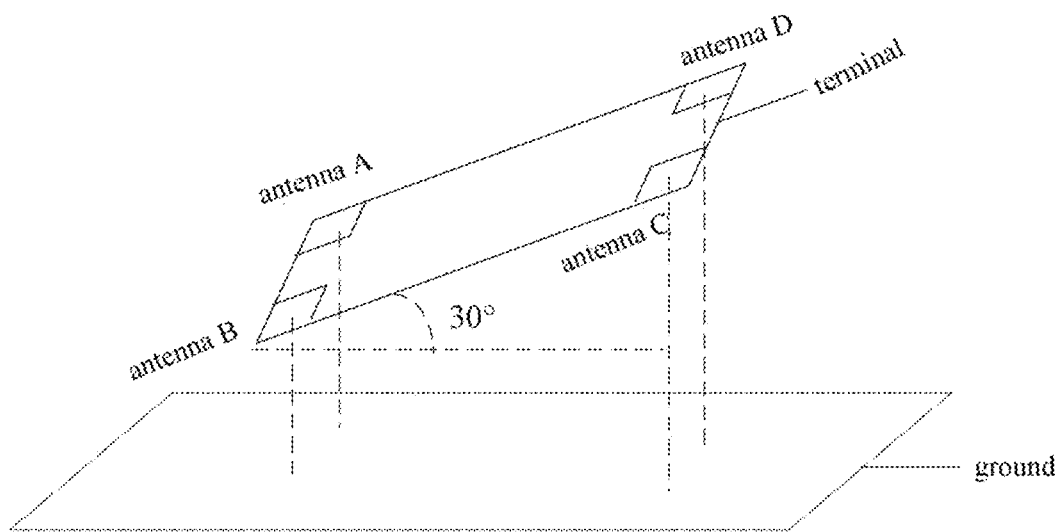
FIG. 10 is a schematic diagram of an inclinedly dropping terminal provided by an embodiment of the present application.

As shown in FIG. 10, the landing angle and azimuth of the terminal are detected. When the terminal is grounded at a certain angle, the landing angle can be calculated as 30 degrees according to the distance difference between two charge sensing elements. It should be noted that since the material of the object approached by the terminal is fixed when landing, the distance can be directly determined according to the induced charge value by looking up the correspondence table of the induced charge value, distance and material. Certainly, the distance can also be calculated according to the aforementioned L=VT/2.

Figure 11:
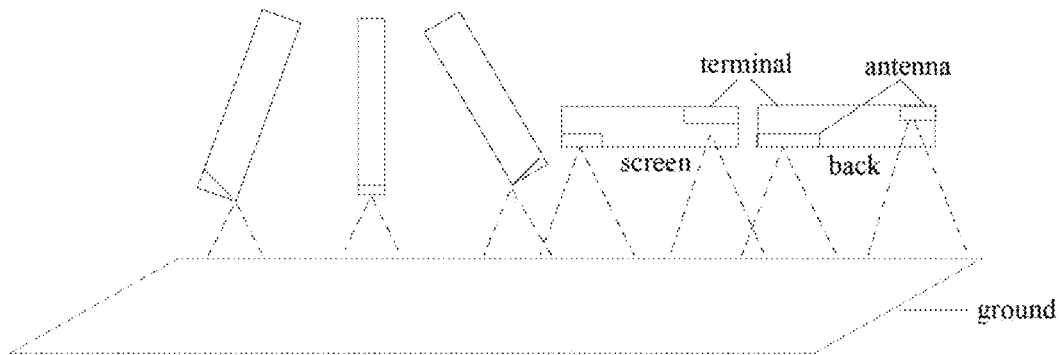
FIG. 11 is a schematic diagram of different falling states of a terminal provided by an embodiment of the present application.

As shown in FIG. 11, when the terminal is landing on the ground at different angles and directions, the induced charge values of different charge sensing elements are different, and the distances are different, so that the landing angle and direction can be determined.

EXAMPLE FIVE

Figure 12:
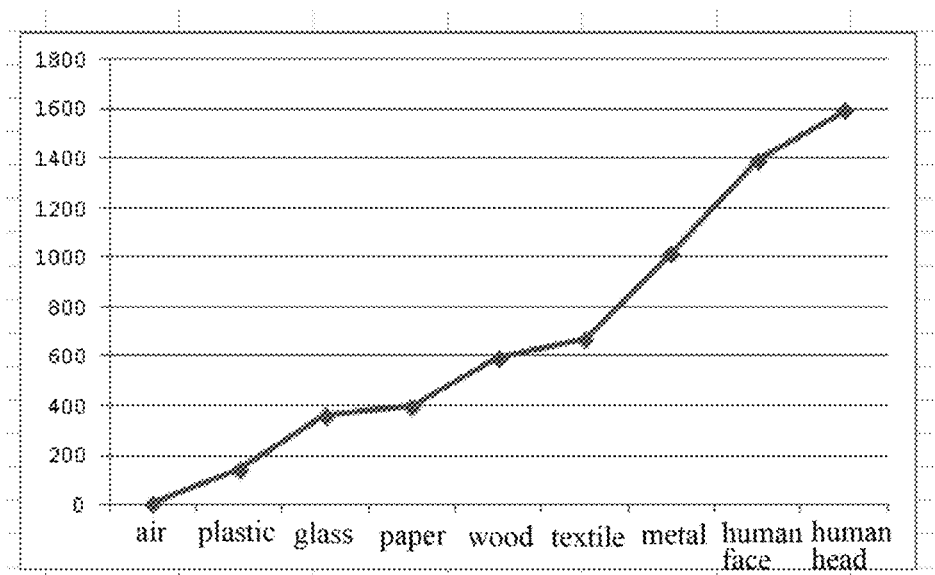
FIG. 12 is a schematic diagram of charge sensing values of different materials provided by an embodiment of the present application.

When an object with different material attributes approaches or contacts the terminal, the induced charge value of the charge sensing element will be different. By comparing the induced charge to the pre-stored material parameter model, which object or platform currently in contact with the terminal can be determined. If the objects contacted by the terminal are wood, glass, iron products, plastics, textiles, paper products, stones, human hands, human face, etc., examples of detected charge sensing values are shown in FIG. 12 respectively.

When the terminal is placed on the platform of the above materials, there may be slight differences in the contact distance due to slight differences between the same materials, and there may be slight differences in the induced charge values, an error range may be set, as long as the difference between the detected value and the set value is within the error range (such as plus or minus 30~50), for example, the difference between the detected value and the set value is within the error range, it can be determined as the same material. The specific error range can be set as required.

EXAMPLE SIX

If the terminal is in contact with or approaches different objects, such as card reader, entrance guard, subway and bus card reader, billboard, the terminal may detect what platform the current medium is, and may automatically link a corresponding communication function, functions of passing the entrance guard, card swiping, transaction, downloading or shooting corresponding information can be completed, which makes the use of the terminal very convenient and intelligent.

Collect and customize objects close to or in contact with terminal which are not basic pre-stored materials, such as in contact with another terminal, in contact with the card reader of entrance guard, storing it after collecting and confirming several times (such as 3 times) as a new state detection and identification object, and designate a corresponding application, thus realizing an automatic card swiping function when approaching the card reader.

As another example, when two terminals touch or come close to each other, when the approaching terminal is determined to be a pre-stored material, according to different distances and angle information, the interconnection functions such as Bluetooth or WI-FI can be turned on to realize a complicated operation of opening a corresponding function button without opening interface of the terminal.

Figure 13:
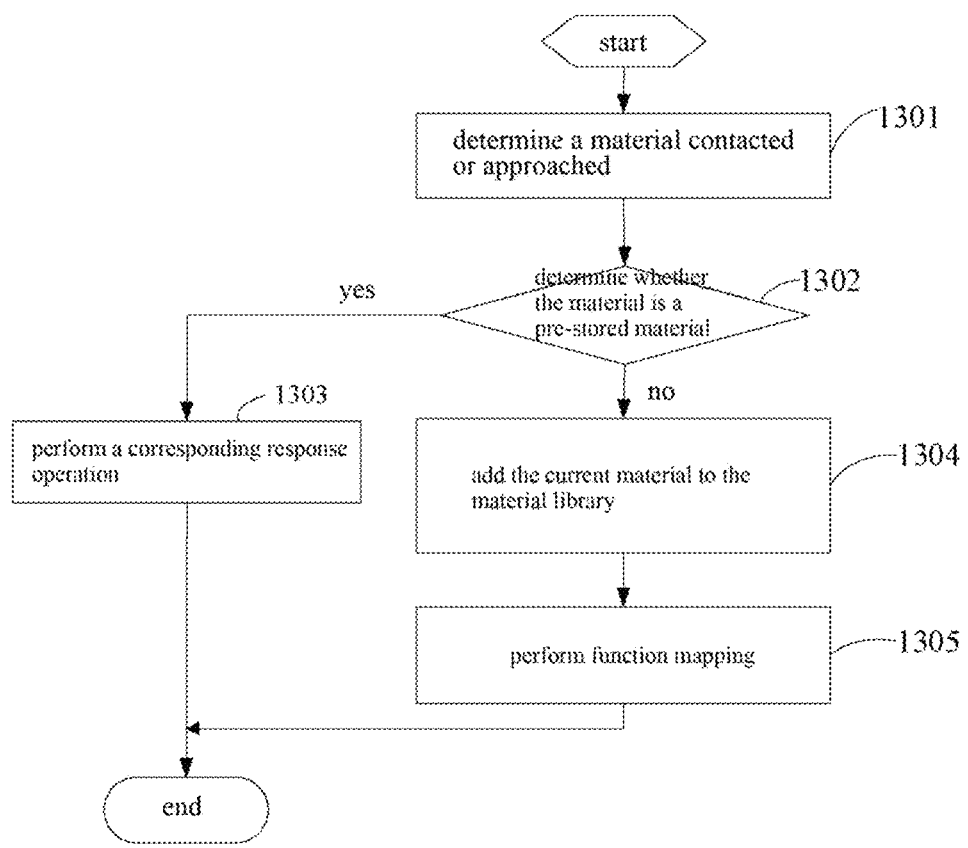
FIG. 13 is a schematic diagram of material detection provided by an embodiment of the present application.

A specific process is shown in FIG. 13, including:

Step 1301: determining a material currently contacted or approached by the terminal;

Step 1302: determining whether the material is a pre-stored material in a material library, if yes, performing step 1303, if not, performing step 1304;

Step 1303: performing a corresponding response operation when contacting the material, and ending;

It should be noted that if the material is a pre-stored material in the material library, and there is no corresponding response operation, it will directly end.

Step 1304: adding the current material to the material library;

Step 1305: reminding the user to perform function mapping, and storing the mapping function set by the user, and ending.

Function mapping here refers to setting a corresponding function for the current material, such as swiping card, turning on Bluetooth, etc.

Figure 14:
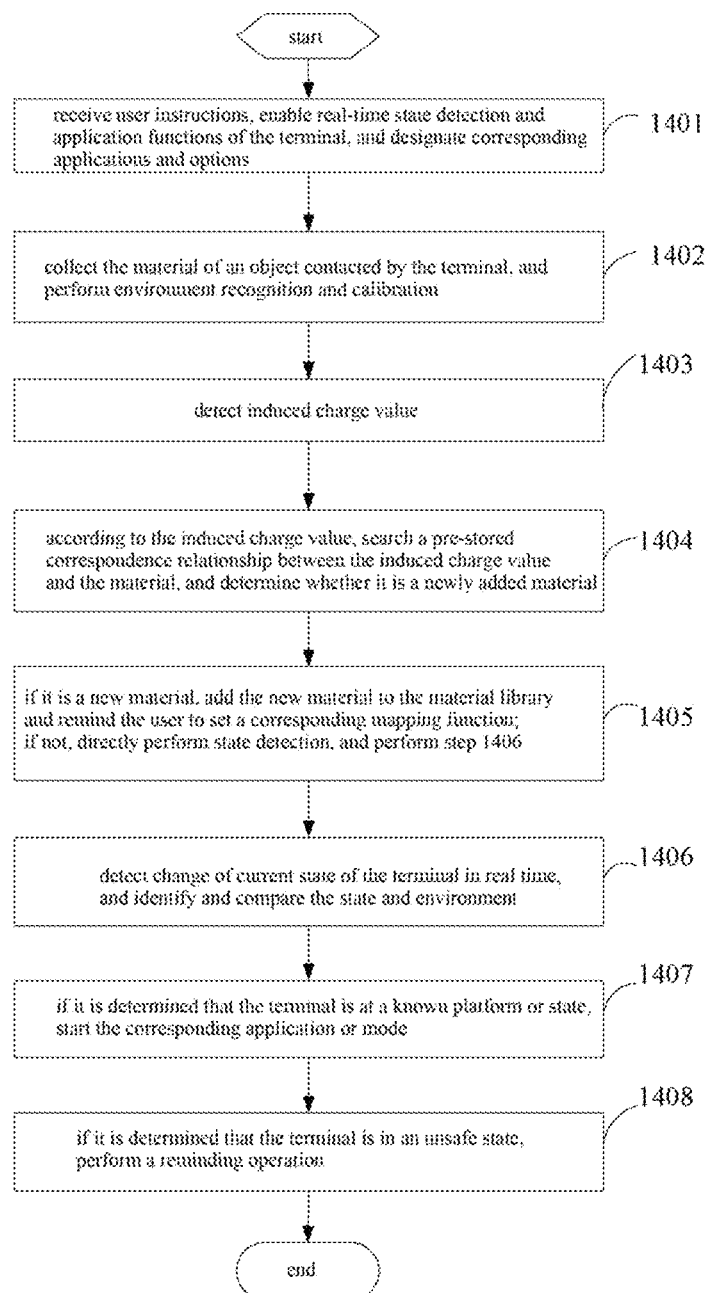
FIG. 14 is a flowchart of a method for state detection provided by an embodiment of the present application.

FIG. 14 is a work flowchart of real-time state detection of a terminal according to an embodiment of the present application. As shown in FIG. 14, which includes:

Step 1401: receiving user instructions, enabling real-time state detection and application functions of the terminal, and designating corresponding applications and options;

For example, choosing to start a corresponding function in a certain state, and so on.

Step 1402: collecting the material of the object contacted by the terminal, and performing environment recognition and calibration;

Step 1403: generating charge and collecting the reflected charge to generate an induced charge value;

Step 1404: according to the induced charge value, searching from a pre-stored correspondence relationship between the induced charge value and the material, and determining whether it is a newly added material;

Step 1405: if it is a new material, adding the new material to the material library and reminding the user to set a corresponding mapping function; if not, directly performing state detection, and performing step 1406;

Step 1406: determining a current state of the terminal according to the induced charge value;

Step 1407: if it is determined that the terminal is at a known platform or state, starting the corresponding application or mode;

Step 1408: if it is determined that the terminal is in an unsafe state, performing a reminding operation.

In this embodiment, the real-time detection of the state and environment of the terminal is realized through charge sensing, and by performing more kind of detections of the static state and motion state, the environment and the contacted platform of the terminal, opening and closing of application functions of the terminal can be more intelligent and flexible.

An embodiment of the present application provides an apparatus for state detection, including a memory and a processor. The memory stores a program. When the program is read and executed by the processor, the following operations are performed:

obtaining the induced charge value;

determining a state of the terminal according to the induced charge value.

For details on how to determine the state of the terminal according to the induced charge value, reference may be made to the foregoing embodiments, and details are not described herein again.

In an alternative embodiment, when the program is read and executed by the processor, the following operation is also performed:

performing a reminding operation, when it is determined that the user needs to be reminded according to the state of the terminal.

In an alternative embodiment, when the program is read and executed by the processor, the following operation is also performed:

Entering a function mode corresponding to the state of the terminal, according to the state of the terminal and a preset correspondence between the state of the terminal and the function mode.

An embodiment of the present application provides a computer-readable storage medium that stores one or more programs, and the one or more programs can be executed by one or more processors to implement the following steps:

obtaining an induced charge value;

determining a state of the terminal according to the induced charge value.

For details on how to determine the state of the terminal according to the induced charge value, reference may be made to the foregoing embodiment, and details are not described herein again.

The computer-readable storage medium includes: USB flash disk, Read-Only Memory (ROM), Random Access Memory (RAM), Mobile Hard disk, magnetic disk or optical disk which can store various program codes.

Although the embodiments disclosed in the present application are as above, the content described is only the embodiments adopted to facilitate understanding of the present application, and is not intended to limit the present application. Those skilled in the art to which this application belongs can make any modifications and changes in the form and details of implementation without departing from the concept and scope disclosed in this application, however, the scope of the present application shall still be subject to the scope defined by the attached claims.

The invention claimed is:

1. An apparatus for state detection, comprising:
one or more charge sensing elements arranged on a terminal;
a charge collection circuit connected to the charge sensing element; and
a state detection module connected to the charge collection circuit;
wherein the charge sensing element is configured to radiate charge generated by the charge collection circuit and transmit reflected charge to the charge collection circuit;
wherein the charge collection circuit is configured to generate charge and radiate the charge out through the charge sensing element, and collect the reflected charge from each of the charge sensing elements to generate an induced charge value of the charge sensing element, and output the induced charge value of each of the charge sensing elements to the state detection module;
wherein the state detection module is configured to determine a state of the terminal according to the induced charge value;
wherein the state detection module comprises a material identification unit which is configured to determine the material of an object currently contacted or approached by the terminal;
wherein the charge collection circuit is configured to obtain a value of time difference from an emission of the charge to a reception of the reflected charge and send the value of time difference to the state detection module; and
wherein the material identification unit is configured to determine a distance between the terminal and the object according to the value of time difference, and according to the induced charge value and the distance, search from a preset correspondence table of the induced charge value, distance, and material to determine the material of the object currently contacted or approached by the terminal.

2. The apparatus for state detection of claim 1, wherein the charge sensing element comprises at least one of the following: an antenna of the terminal, a metal shell of the terminal, a metal frame of the terminal, a metal trace or a coil arranged on a printed circuit board of the terminal.

3. The apparatus for state detection of claim 2, wherein the antenna comprises at least one of the following: an antenna of wireless cellular communication, an antenna of WI-FI and Bluetooth, an antenna of Global Positioning System, and an antenna of Near Field Communication induction.

4. The apparatus for state detection of claim 1, wherein the charge sensing elements are provided at least at four corners of the terminal.

5. The apparatus for state detection of claim 1, wherein the state detection module comprises a state determination unit for performing at least one of the following:
determining whether the terminal is in a safe state according to the induced charge value;
determining a screen orientation of the terminal according to the induced charge value.

6. The apparatus for state detection of claim 1, wherein the state detection module comprises an environment identification and calibration unit, wherein:
the material identification unit is configured to notify the environment identification and calibration unit in response to the material of the object currently contacted or approached by the terminal cannot be determined; and
after receiving a notification of the material identification unit, the environment identification and calibration unit is configured to receive information of the material of the object currently contacted or approached by the terminal input by a user, and store a current induced charge value and the information of the material to the preset correspondence table between the induced charge value and the material, or, update the preset correspondence table between the induced charge value and the material by using the current induced charge value and the information of the material.

7. The apparatus for state detection of claim 1, wherein the apparatus for state detection further comprises:
a state response module connected to the state detection module,
wherein the state detection module is configured to send the state of the terminal to the state response module; and
wherein the state response module is configured to enter a function mode corresponding to the state of the terminal according to the state of the terminal and a preset correspondence between the state of the terminal and the function mode.

8. The apparatus for state detection of claim 1, wherein the apparatus for state detection further comprises:
a state reminding module connected to the state detection module,
wherein according to the state of the terminal, the state detection module is configured to send a reminding instruction to the state reminding module in response to determining that a user needs to be reminded; and
wherein the state reminding module is configured to perform a reminding operation after receiving the reminding instruction sent by the state detection module.

9. A method for state detection, comprising:
generating charge and radiating the charge through one or more charge sensing elements;
collecting a reflected charge from each of the charge sensing elements to generate an induced charge value of the charge sensing element;
determining a state of a terminal according to the induced charge value;
wherein determining a state of the terminal according to the induced charge value comprises
determining a material of an object currently contacted or approached by the terminal according to the induced charge value; and
wherein determining the material of the object currently contacted or approached by the terminal according to the induced charge value comprises:
obtaining a value of time difference from an emission of the charge to a reception of the reflected charge, determining a distance between the terminal and the object according to the value of time difference, and according to the induced charge value and the distance, searching from a preset correspondence table of the induced charge value, distance, and material to determine the material of the object currently contacted or approached by the terminal.

10. The method for state detection of claim 9, wherein the method further comprises:
    receiving information of the material of the object currently contacted or approached by the terminal input by a user, in response to the material of the object currently contacted or approached by the terminal cannot be determined, and
    storing a current induced charge value and the information of the material to the preset correspondence table between the induced charge value and the material, or, updating the preset correspondence table between the induced charge value and the material by using the current induced charge value and the information of the material.

11. The method for state detection of claim 9, wherein the method further comprises:
    in response to no reflected charge being collected from the charge sensing element, increasing detection distance to regenerate charge and radiate the charge out through the charge sensing element.

12. The method for state detection of claim 9, wherein the method further comprises:
    performing a reminding operation in response to determining that a user needs to be reminded according to the state of the terminal.

13. The method for state detection of claim 9, wherein the method further comprises:
    entering a function mode corresponding to the state of the terminal according to the state of the terminal and a preset correspondence between the state of the terminal and the function mode.

* * * * *